(12) United States Patent
Cruyff et al.

(10) Patent No.: US 6,401,337 B1
(45) Date of Patent: Jun. 11, 2002

(54) APPARATUS AND METHOD FOR INSERTING SPOKES IN HOLES OF A HUB FLANGE

(75) Inventors: Marcel Cruyff, Den Ilp; Henk Brugge, Noord Beemster; Antonius Simon Admiraal, Limmen, all of (NL)

(73) Assignee: Holland Mechanics B.V, Purmerend (NL)

( * ) Notice: Subject to any disclaimer, the term of this patent is extended or adjusted under 35 U.S.C. 154(b) by 0 days.

(21) Appl. No.: 09/508,348

(22) PCT Filed: Aug. 31, 1998

(86) PCT No.: PCT/NL98/00489

§ 371 (c)(1),
(2), (4) Date: May 31, 2000

(87) PCT Pub. No.: WO99/12754

PCT Pub. Date: Mar. 18, 1999

(30) Foreign Application Priority Data

Sep. 10, 1997 (NL) ............................................ 1006988

(51) Int. Cl.[7] ................................................ B21K 1/34
(52) U.S. Cl. .................... 29/894.343; 29/709; 157/1.55

(58) Field of Search ............................... 29/894.33, 709, 29/894.343; 157/1.5, 1.55

(56) References Cited

U.S. PATENT DOCUMENTS 4,538,332 A * 9/1985 Carminati ................ 29/894.33
5,081,755 A * 1/1992 Hishikawa ............... 29/894.33

FOREIGN PATENT DOCUMENTS

| DE | 31 03 552 | 9/1982 |
| EP | 0 424 050 | 4/1991 |
| FR | 2 507 969 | 12/1982 |
| GB | 1 388 756 | 3/1975 |
| WO | WO 95 03184 | 2/1995 |

* cited by examiner

Primary Examiner—P. W. Echols
(74) Attorney, Agent, or Firm—Rod D. Baker (57) ABSTRACT

An apparatus for automatically loading spokes in to the hub of a spoked wheel. The spokes are inserted one at a time through the holes of the flanges of the hub. The direction of the hub axle is horizontal and the spoke inserters are moved toward the flanges. The holes in the flanges are detected by means of a sensor.

18 Claims, 7 Drawing Sheets

APPARATUS AND METHOD FOR INSERTING SPOKES IN HOLES OF A HUB FLANGE

The invention relates to an apparatus for inserting spokes into holes of a hub flange according to the preamble of claim 1.

Such an apparatus is known from EP A 0424050. The disadvantage of the known apparatus is that the spoke is not guided sufficiently accurately with respect to the ejection opening. The objective of the spring valve that can be seen in the known apparatus is that it gives the air flow a high velocity when ejecting the spoke and the spring valve does not rest against the spoke, allowing the same to assume different positions with respect to the ejection opening. There is very little play around the spoke in the hole of the hub flange, for instance, less than 0.5 mm so that, due to the play of the spoke in the ejection opening, positioning of the spoke is not sufficiently accurate, with the result that the spoke may strike the rim of the hole or that the thread on the shaft of the spoke sometimes catches on the rim of the hole, causing defects.

In order to eliminate this drawback the apparatus is embodied in accordance with the following specification.

An alternative embodiment prevents the spokes falling into and being caught in the spoke holder from jamming against the spoke guiding means if they are somewhat bent, even though they are unable to rotate around their longitudinal axis.

An alternative embodiment requires no active control for the pressing means. Another alternative embodiment allows the spoke to be supplied head down so that after insertion the spokes fall down with the shaft. The result is that the spokes, after insertion, hang down so that they will not jam and cause defects while being rotated in the hub support.

Another embodiment allows for sufficient space to catch the spokes, while they are unable to rotate in the spoke channel. In this embodiment, the spoke channel comprises dimensions of approximately 5 mm and approximately 8 mm. In another embodiment the spoke channel is closed at four sides during insertion, so that the spoke is guided properly. In the apparatuses of the prior art it is not possible to bring the ejection openings close to the hub flange in front of the holes through which the spokes have to be inserted outward from between the hub flanges. The spoke holders then jam against the flanges if the direction of insertion is more or less in the longitudinal direction of the hole in the hub flange, which is necessary if there is little play between a spoke and a hole in the hub flange.

In order to avoid the above drawback, the apparatus in accordance with a further improvement is embodied to insert spokes over a distance of at least 40 mm from the ejection opening, the spoke guiding means are formed by a wall which, at the side facing the hub, has a thickness of less than approximately 1.0 mm. This makes it possible to insert the spoke close to a hub flange into a hole in the overlying flange.

Another embodiment allows the ejection opening to be moved to the hole in the overlying flange in a straight line, allowing the spoke holder to be moved to the hub flange.

In accordance with a further improvement of the invention, the apparatus is embodied wherein a spoke turner is provided between the spoke sorting means and the spoke holder, for turning the head of a separated spoke downward. To insure that the spoke falls properly after insertion, it is essential that the head points down. This can be guaranteed by positioning the spoke with the head pointing downward.

In accordance with one embodiment the apparatus is embodied so that the spoke turner comprises catching means for a separated spoke, and alignment means capable of moving to the head of the caught spoke. This is a simple manner of positioning the spoke in the desired manner.

During loading the hub rotates, always positioning the next hole in front of the inserter, with the inserted spokes projecting from the holes in the hub flanges. In the prior art apparatus these spokes may come into contact with the hubs that are presented, which may cause a defect.

In order to avoid the above-mentioned drawback, the apparatus is embodied so that the hubs are conveyed to the hub support by conveyor means comprising a gripper. After the loaded hub is removed, the hubs can be conveyed conveniently by using a gripper.

In another embodiment the hub is unambiguously positioned in the axial direction irrespective of the width of the hub, thereby facilitating the positioning on the hub support.

In the prior art apparatus where the rotation means comprise a drive roll pushing against the hub flange, the spokes are inserted at the top side of the hub flanges. This results in some of the spokes falling onto the hub axle which means that the spokes may become jumbled and cause a defect.

In accordance with one embodiment the apparatus is embodied so that the rotation means comprise a drive roll pushing against the hub flange wherein for every hub flange the spoke guide means, the ejector openings and the respective sensors are directed at a location hole which lies on a horizontal plane through the hub axle, and the drive roll pushes against the hub flange above said horizontal plane. This embodiment allows the spokes to fall freely without touching the hub or the drive roll.

The drive roll pushes against the hub flange in a direction of approximately 45 to 75 degrees in relation to the horizontal plane.

In yet another embodiment the hub support can be simply adjusted for a hub of different dimensions, while hubs of the same dimensions can be fitted quickly into the apparatus.

Still another embodiment allows simple adjustment to another hub dimension by bringing both adjustable spoke inserters together onto the correct position.

The invention also comprises a method relating to the method known from EP A 0424050. The disadvantage with the known apparatus is that it is not always certain that the spoke, after it has been inserted, will hang head down so that the bend in the shaft can turn through the hole in the hub flange, allowing the shaft to fall through. If the head points upward, it will rest on the hub flange and the weight of the shaft will pull the bend out of the hub flange with the result that the shaft will not fall through.

In order to avoid the above-mentioned drawback, insertion is carried out in accordance with the characterizing part of claim 17. Guiding the spoke's downward pointing head until the spoke's shaft, after having been inserted, can fall through at the other side of the hub flange, will prevent the head from turning upward, which would hinder the shaft's falling through.

In the prior art apparatus, after a spoke has been inserted into a hole of the first hub flange a next hole in the second hub flange is brought before the insertion position by rotating the hub flange in such a way as to move the inserted spoke downward. In this way the inserted spokes do not interfere with holes whose positions have still to be detected. If, due to loose flanges or manufacturing faults the holes in the two flanges are not staggered in the usual way, but are in the direction of rotation positioned close together, then the next hole is not easily detectable.

In order to avoid this drawback the method is carried out in accordance with claim 18. This method ensures that the next hole is found, even if it is at the same rotation position as the loaded hole in the other hub flange.

The invention will now be elucidated with reference to a few exemplary embodiments which will be discussed with the assistance of drawings in which.

The figures are schematic representations of the various parts in which the known and standard constructions such as, for instance, drive cylinders, fastenings and the like are not always shown. Wherever possible, corresponding parts in the various figures carry the same reference numbers.

Figure 1:
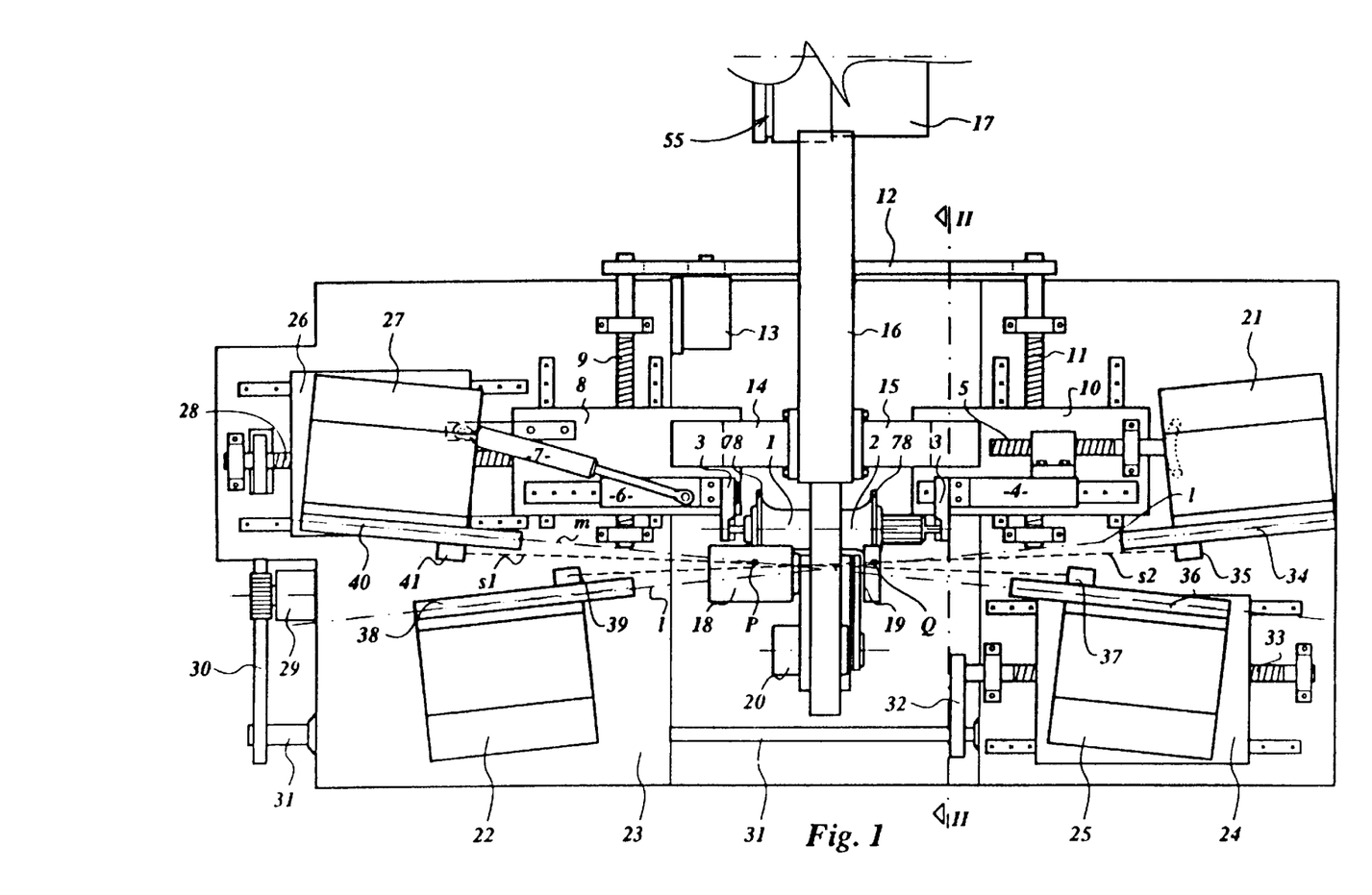
FIG. 1 shows the top view of a hub loader according to the invention.

A hub 1 to be loaded with spokes and having a hub axle 2 is supported by a hub support 3 comprising two parts. The first part of the hub support 3 is attached to a carriage 4 which is movable in the direction of the hub axle 2 by means of manual adjustment 5. In another embodiment the manual adjustment 5 is replaced by a stepping motor which is coupled to the control. This allows simple adjustment of the apparatus to a hub of a different dimension, provided this dimension is known to the control.

The second part of the hub support 3 is attached to a carriage 6 which is also movable in the direction of the hub axle 2 by means of an air cylinder 7. The carriage 6 is attached to a carriage 8 which is movable by means of a first positioning spindle 9 in a direction perpendicular to the direction of the hub axle 2, and the carriage 4 is attached to a movable carriage 10 which is movable by means of a second positioning spindle 11 in a direction perpendicular to the hub axle 2. The carriages 8 and 10 are mounted to a frame 23 by means of guides.

The positioning spindles 9 and 11 are coupled by means of a cogged belt 12 and are driven by a drive 13. The carriages 8 and 10 are provided with supports 14 and 15 to which a gripping support 16 is fastened. In the gripping support 16 a gripper is movably mounted as will be discussed hereinbelow, for the conveyance of the hubs to be loaded from an apron feeder 17 to the hub support 3.

Also attached to the gripping support are a motor 20 with a wide driving roll 18 and a narrow driving roll 19. These driving rolls make the hub 1 rotate around the hub axle 2, thereby positioning the holes 81 in hub flanges 78 in a first location point P or a second location point Q. In order to position the holes 81 on the location points P and Q, the motor 20 and the drive 13 are controlled by a control (not shown) and with the aid of sensors to be discussed hereinbelow. With hubs 1 whose holes 81 are at a constant radius it is not necessary to always use the drive 13, and it suffices to locate the holes 81 by rotating the hub 1 around the hub axle 2. With poor hubs the position of the hub axle 2 can also be adjusted for each hole 81 by using the drive 13.

The first location point P is adjustable to the width of the hub 1 and has an adjustable feed direction m. Through this location point P the spokes are supplied to the outside of the hub flange 78 by means of an adjustable spoke inserter 27 and a spoke holder 40, and to the inside of the hub flange 78 by means of an adjustable spoke inserter 25 and a spoke holder 36. A sensor beam S1 determines whether or not the hole 81 of the flange 78 is positioned in the location point P, the sensor beam S1 runs from a sender 37 to a receiver 41. The position of the spoke inserters 25 and 27 is adjustable because they are mounted on a carriage 24 or 26 respectively. These carriages 24 and 26 are mounted with guides on the frame 23, and are movable in the direction of the hub axle 2. To this end they are coupled via a spindle 28, a cogged belt 30, an axle 31, a cogged belt 32 and a spindle 33, and are riven by a motor 29. This apparatus is used when a hub 1 of different dimensions has to be loaded with spokes. The sender 37 and the receiver 41 are also directed at the location point P because they are adjusted simultaneously with the spoke inserter.

The second location point Q is stationary and has a fixed feed direction l. Through this location point Q the spokes are fed to the outside of the hub flange 78 by a stationary spoke inserter 21 and a spoke holder 34, and to the inside of the hub flange 78 by a stationary spoke inserter 22 and a spoke holder 38. A sensor beam S2 detects whether or not the hole 81 of the flange 78 is positioned in the location point Q, the sensor beam S2 runs from a sender 35 to a receiver 39.

Figure 2:
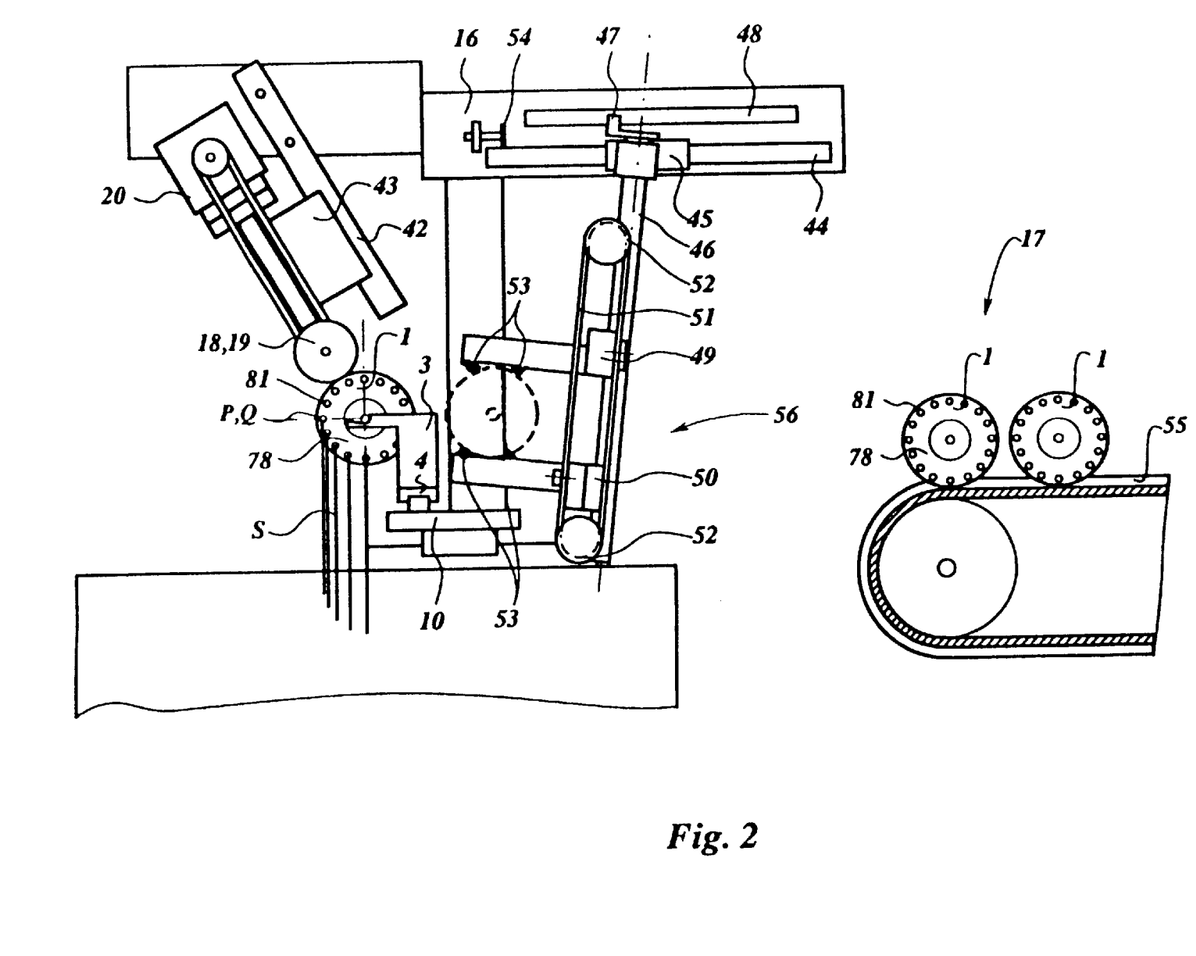
FIG. 2 shows a side view according to II—II of the hub loader of FIG. 1.

FIG. 2 shows the hub 1 resting on the hub support 3. The driving rolls 18, 19 push the hub 1 into the hub support 3 by means of an air cylinder which is not shown, with the driving rolls 18, 19 and the motor 20 with a carriage 43 are able to move along the guide. The drive rolls 18, 19 are located above location points P and Q, so as not to interfere with the inserted spokes S hanging down.

To carry the hubs from the apron feeder 17 to the hub support 3, a gripper 56 is applied. A carriage 45 moves along a guide 44 under the influence of an air cylinder (not shown). In the carriage 45 a rotatably mounted gripper shaft 46 is provided whose rotation is controlled by a cam 47 and a guide plate 48. The movement along the carriage 44 causes the gripper shaft 46 to rotate, directing the gripper 56 alternately to the hub support 3 or the apron feeder 17. An upper clamp 49 and a lower clamp 50 can be moved up and down by means of an air cylinder, the movement being coupled via a cogged belt 51 and discs 52. This ensures that the middle between grip rollers 53 always stays at the same height. A buffer 54 ensures that the gripper always stops at the same place, so that the centre of the presented hub is positioned exactly correctly with respect to the hub support 3. The apron feeder 17 is provided with a flange guide 55, so that always at least one flange 78 is positioned in the same place, so that it is in the correct position with respect to the grip rollers 53.

Figure 3:
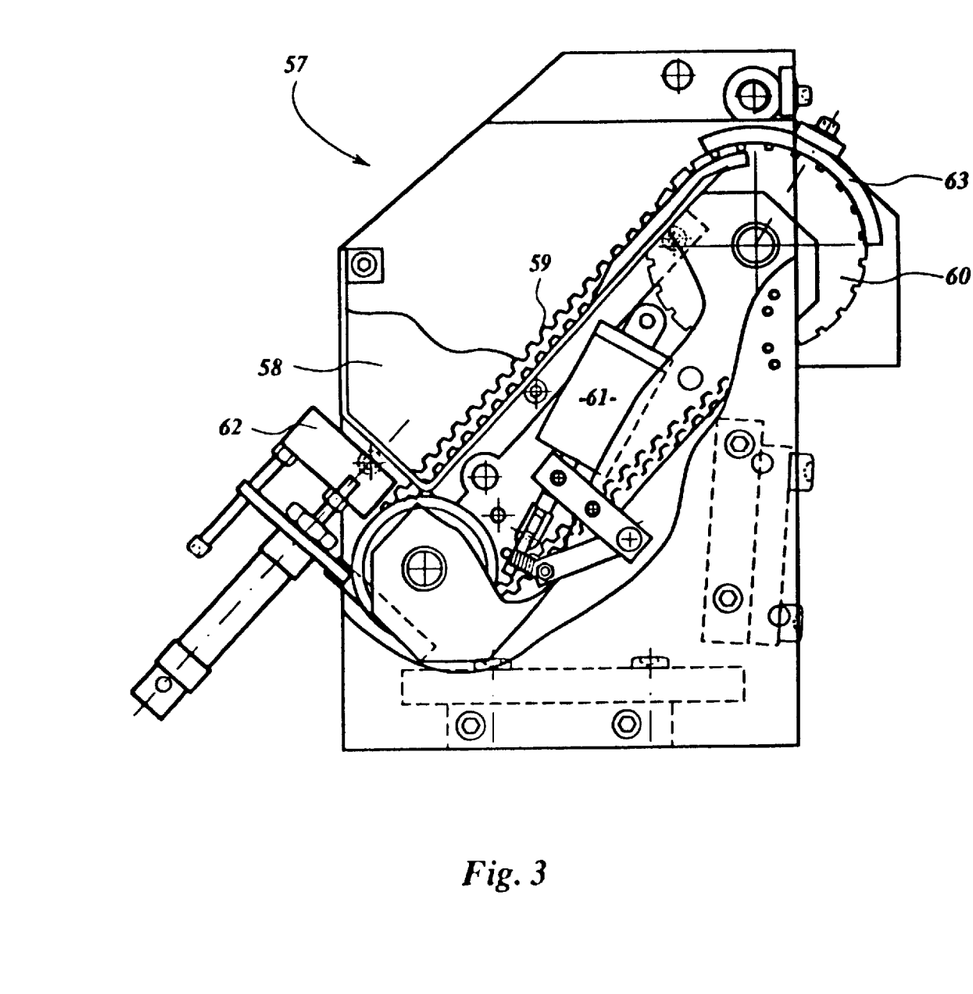
FIG. 3 shows a side view of an embodiment of a spoke sorter.

FIG. 3 shows an embodiment of a spoke sorter 57. A container holds a supply of spokes 58, which supply is lifted therefrom by means of a wide double-sided cogged belt 59. The belt is driven by an intermittent drive 61 conveying pitch by pitch. A pusher 62 is provided to prevent the spokes becoming a solid bundle.

Between the cogs of the belt 59 one or more spokes may be deposited. At the top, surplus spokes between the cogs are pushed out by a push-out disc 60, leaving always one spoke between the push-out disc 60 and the cap 63.

Figures 4, 5:
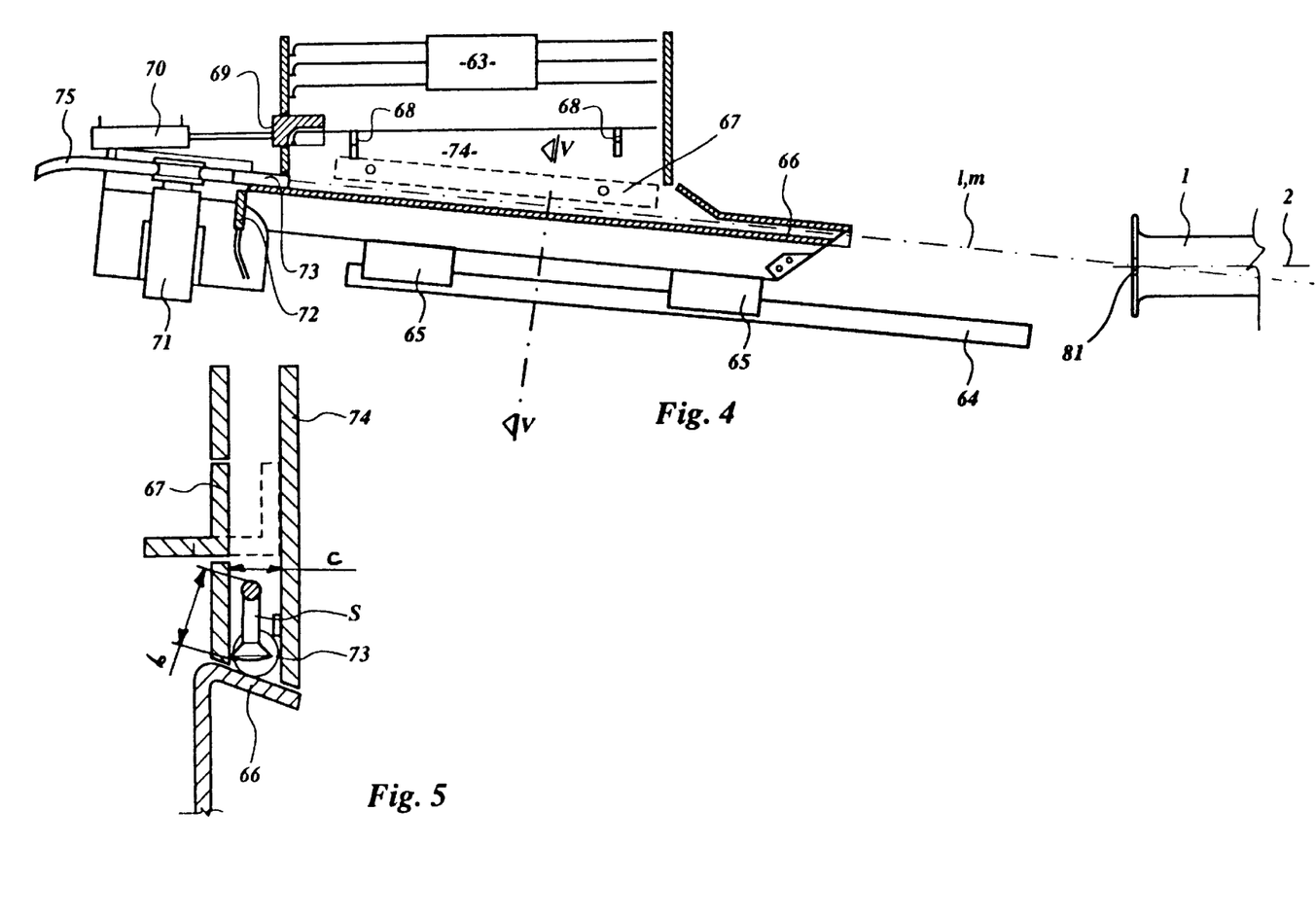
FIG. 4 shows a schematic side view of a first embodiment of a spoke holder as applicable in the apparatus according to FIG. 1.
FIG. 5 shows the cross section V—V of FIG. 4.

FIGS. 4 and 5 show schematically how the spoke holder works. The spokes under the cap 63 of the spoke sorter are in position for use. After a signal a spoke falls into the aligning position and remains lying on the two pawls 68. Subsequently an alignment head 69 moves toward the spoke to direct the head downward. The alignment head is moved by means of a cylinder 70. The pawls 68 are mounted on a spoke holder wall 74. The pawls 68 release the spoke which falls on the spoke holder floor 66 which has a slight incline so that the spoke does not bounce, or bounces only a little. The spoke holder with carriages 65 then moves along a guide 64 to the hub flange 78. The guide 64 runs in the feed direction 1 or m. When feeding, the spoke holder is moved so close to the hub flange that it almost abuts.

When the spoke is lying on the spoke holder floor 66, it is locked in at the top side by means of a enclosing element 67. This may be a bent-over plate or some pegs, which prevent the spoke from moving upward. There is some play, in the region of 1–2 mm, around the spoke in the spoke holder so that a bent spoke will not jam. In addition, the spoke holder is shaped such that the head of the spoke can easily slide along the sides without jamming. The width c of the spoke holder channel is as large as possible. Near the floor 66 said width is less than the biggest dimension b perpendicular to the shaft of the spoke. This prevents the spoke from rotating once it has been aligned by the alignment head 69.

The spoke is pushed into feed direction by a belt 75 driven by a motor 71 and a rubber roll mounted thereon. The head of the belt is provided with a metal part 73 which can be detected by the sensor 72 and which pushes on the head of the spoke S.

Figure 6:
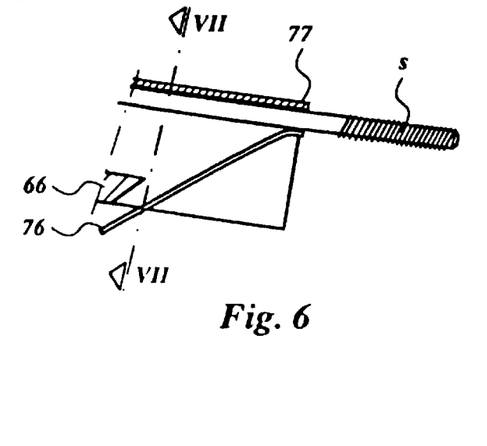
FIG. 6 shows the ejection opening of the spoke holder according to FIG. 4.
Figure 7:
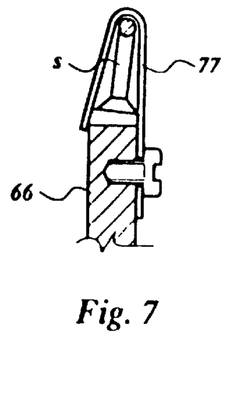
FIG. 7 shows the cross section VII—VII of FIG. 6.

FIGS. 6 and 7 show how the spoke S is accurately positioned at the ejection opening at the end of the spoke holder. To this end the spoke S is pushed by a leaf spring 76 against a guide plate 77. The guide plate is made of thin strong steel with a thickness of less than 1.0 mm and preferably less than 0.5 mm, and is shaped as shown, in order to allow the spoke holder to be guided closely past the hub flanges 78. At the top also the guide is very thin, so that the spoke holder can also be guided under the rolls 18 and 19.

Figure 8:
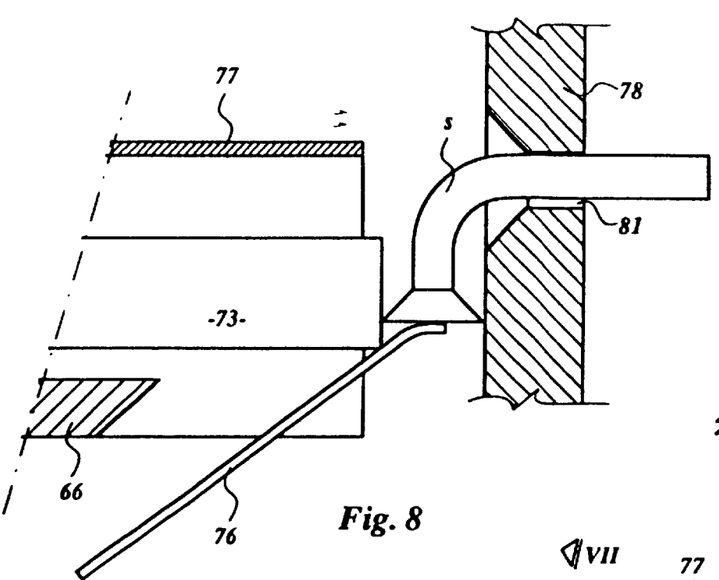
FIG. 8 shows the ejection opening after a spoke has been inserted through the hole in a hub flange.
Figure 9:
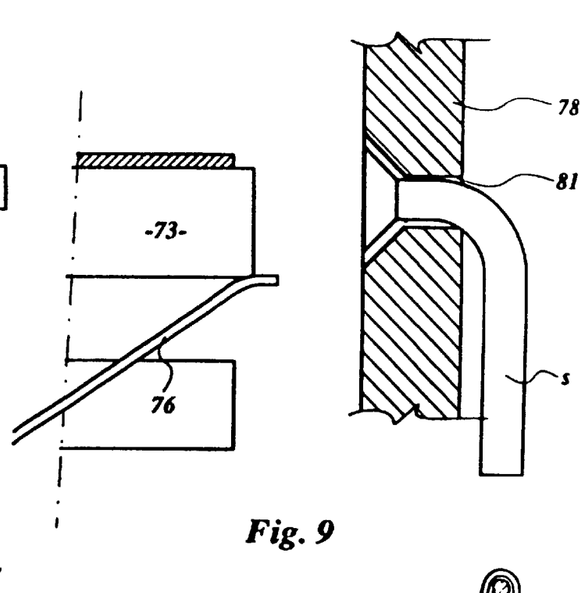
FIG. 9 shows a hub flange with an inserted spoke.

FIGS. 8 and 9 show how to ensure that during insertion the head of the spoke S stays downward, in order for the spoke S with the right-angled head to turn through the hole 81 in a hub flange 78 under the influence of the spoke's S weight. The metal part 73 of the belt pushes the head of the spoke against the flange 78. The head of the spoke S comes free from the guide only during the last portion, which ensures that the head stays pointing downward. The leaf spring 76 pushes the head upward which, together with the weight of the spoke S, causes it to turn downward through the hole 81 in the flange 78.

Figure 10:
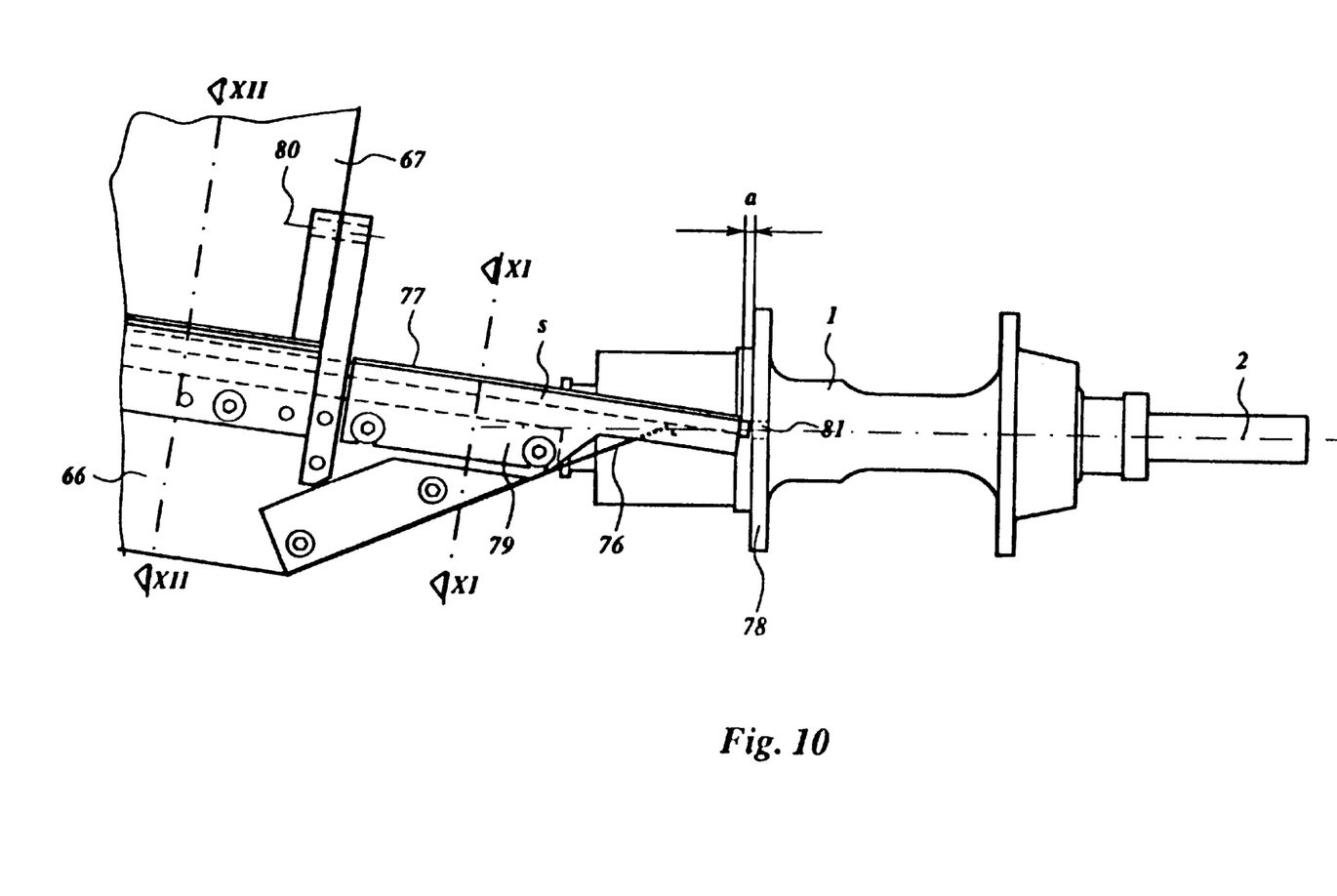
FIG. 10 shows a schematic side view of a second embodiment of the spoke holder according to FIG. 4.
Figure 11:
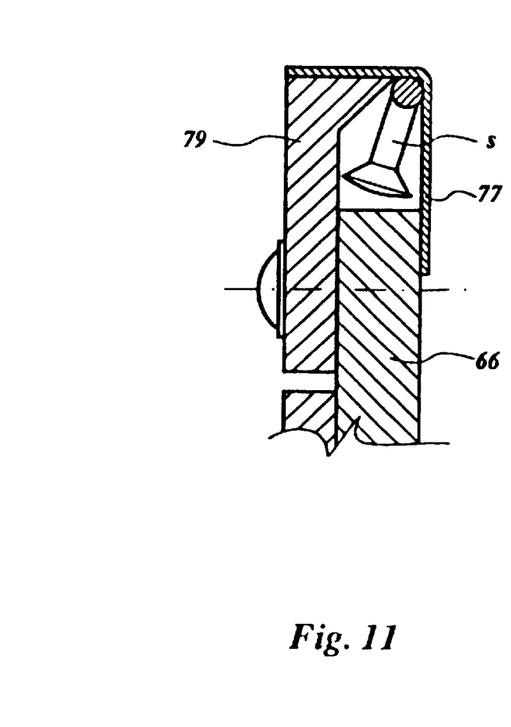
FIG. 11 shows the cross section XI—XI of FIG. 10.
Figure 12:
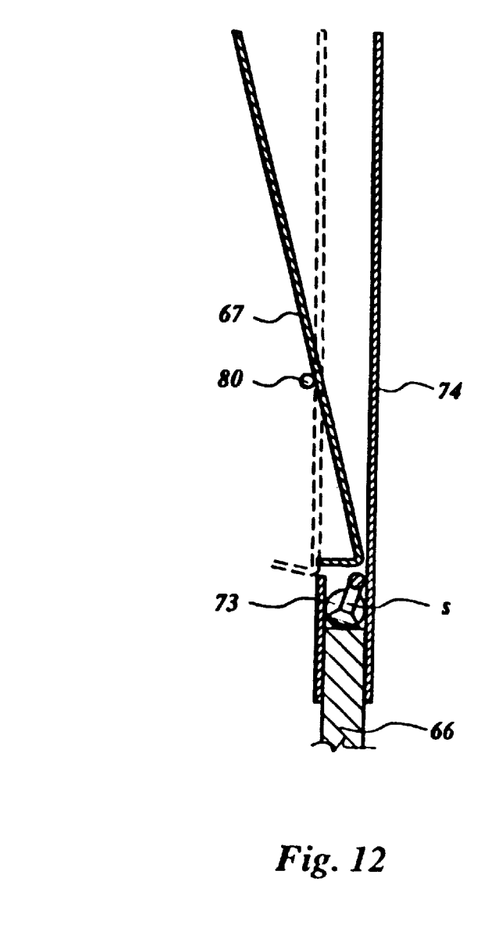
FIG. 12 shows the cross section XII—XII of FIG. 10.

The FIGS. 10, 11 and 12 show a second embodiment 30 of a spoke holder in a position where the spoke S is placed before the hole 81 in the hub flange 78. The leaf spring 76 pushes the spoke S against the guide plate 77.

In this embodiment the guide plate 77 is fastened to the spoke holder floor 66 and a support strip 79. As shown in FIG. 10, the guide plate 77 and the support strip 79 form a channel of which the underside, the side facing the hub 1, is open to allow the spring 76 to push against the shaft of the spoke S, positioning it accurately. The spoke holder is positioned at a distance a from the hub flange 78, and a is smaller than the diameter of the head of the spoke, for example less than 3 mm. After the spoke S has fallen head down onto the spoke holder floor 66, the confining element 67 is tilted around an axle of tilt 80. In another embodiment the confining element 67 is tilted while the spoke S is falling, causing the same to jam between the confining element 67 and the spoke holder wall 74. The confining element 67 is then slowly opened and the spoke S falls onto the spoke holder floor 66 without bouncing. Then the confining element 67 is closed again. The spoke S is then pushed by the metal part 73 through the hole 81 in the hub flange 78. While the spoke S is being pushed through the hole 81, forces are exerted on the spoke which would cause the same to rotate around its longitudinal axis. To prevent this, the guide plate 77 and the support strip 79 extend to close to the hub flange 78.

The support strip 79 and the spring 76 are designed such that the position of the spoke's shaft before insertion is determined accurately. During insertion the spring 76 must be able to deflect in order to allow the head of the spoke to pass. In another embodiment the spring 79 may be replaced by an excited pawl, which is excited via the control by means of electricity or compressed air.

To load a flange 78 with spokes from both sides, the spoke holder is brought to a distance a of less than 3 mm from the hub flange 78. This means that two of the four spoke holders must be able to move past a flange 78 in the feed direction 1 or m. The distance between the flanges 78 may, for example, be 8 to 12 cm. By designing the two respective spoke holders such that over at least 40 mm, or optionally over at least 80 mm, they are very narrow by using a very thin guide plate 77, the respective spoke holder is able to move past the hub flange. The feed directions 1 and m then create an angle of about 10° with a plane through the hub axis 2.

What is claimed is:

1. An apparatus for inserting spokes having a right-angled head and a shaft into holes of hub flanges of a hub comprising a hub support for the support of the hub in horizontal position, rotation means for rotating the hub around a hub axle, sensors for detecting the holes in the hub flanges, spoke inserters positioned at either side of the hub, which comprise spoke sorters for the separation of always one single spoke, a spoke holder movable between a spoke catching position and an insertion position, in which a separated spoke can be caught and which is provided with spoke guiding means and an ejector opening for guiding the spoke during insertion and drive means for moving a spoke from the spoke holder through a hole, positioning means for the sensor-aided positioning of the holes in the hub flange into substantial alignment with the ejector opening, and control means for controlling the apparatus wherein the ejector opening comprises a spoke support and pressing means for, during inserting, pushing the shaft of the spoke against the spoke support, which pressing means can be swung aside to allow the head of the spoke to pass.

2. An apparatus for inserting spokes according to claim 1 wherein the spoke channel formed by the spoke guiding means is narrower than the biggest dimension of the spoke head perpendicular to the shaft, so that the spoke is unable to rotate in the channel.

3. An apparatus for inserting spokes according to claim 1 wherein the pressing means comprise a springy element.

4. An apparatus for inserting spokes according to claim 3, wherein the spoke support is positioned above the springy element.

5. An apparatus for inserting spokes according to claim 1 wherein at the drive side where the spoke is caught, the spoke channel comprises dimensions of approximately 5 mm and approximately 8 mm.

6. An apparatus for inserting spokes according to claim 1 wherein at the drive side of the spoke channel is provided with movable guiding means for closing and opening the spoke channel at its tip side.

7. An apparatus for inserting spokes according to claim 1 herein over a distance of at least 40 mm from the ejection opening, the spoke guiding means are formed by a wall which, at the side facing the hub, has a thickness of less than approximately 1.0 mm.

8. An apparatus for inserting spokes according to claim 1 wherein over a distance of at least 80 mm from the ejection opening, the spoke guiding means are formed by a wall which, at the side facing the hub, has a thickness of less than approximately 1.0 mm.

9. An apparatus for inserting spokes according to claim 1 wherein a spoke turner is provided between the spoke sorting means and the spoke holder, for turning the head of a separated spoke downward.

10. An apparatus for inserting spokes according to claim 9 wherein the spoke turner comprises catching means for a separated spoke, and alignment means capable of moving to the head of the caught spoke.

11. An apparatus for inserting spokes according to claim 1 wherein the hubs are conveyed to the hub support by conveyor means comprising a gripper.

12. An apparatus for inserting spokes according to claim 11 wherein the gripper has means for clamping a hub flange.

13. An apparatus for inserting spokes according to claim 1 wherein the rotation means comprise a drive roll pushing against the hub flange wherein for every hub flange the spoke guide means, the ejector openings and the respective sensors are directed at a location hole which lies on a horizontal plane through the hub axle, and the drive roll pushes against the hub flange above said horizontal plane.

14. An apparatus for inserting spokes according to claim 13 wherein the drive roll pushes against the hub flange in a direction of approximately 45 to 75 degrees in relation to the horizontal plane.

15. An apparatus for inserting spokes according to claim 1 wherein the hub support comprises two axle supports, of which a first axle support is adjustable to a position which depends on the dimensions of a hub, and of which a second axle support, by means of a support drive, pushes each hub to be loaded against the first axle support.

16. An apparatus for inserting spokes according to claim 1 wherein a first pair of spoke inserters and their respective sensor are located at a fixed position in relation to the hub support, while a second pair of spoke inserters and their respective sensor are movable by conveyor means, with the distance between the spoke inserters in each of said two pairs remaining constant.

17. A method for inserting spokes into holes of a hub flange of a hub comprising a horizontally supporting hub support, comprising the steps of:

providing spoke inserters at either side of the hub flange;

separating with spoke sorters a spoke having a right-angled head and a shaft;

catching a spoke in a spoke holder;

inserting and guiding the spoke with the aid of guiding means terminating in an ejector opening;

positioning with the aid of a sensor and a control the hole and the ejector opening to substantially align the hole with the shaft of the spoke;

pushing a spoke from the ejector opening through a hole into the hub flange and moving the ejector opening toward the hub flange to a distance from the hub flange which is smaller than the diameter of the head of the spoke; and inserting the spoke through the hole in the hub flange while ensuring, by guiding the head until it abuts against the hub flange, that during insertion the head remains pointing downward.

18. A method according to claim 17 further comprising the steps of:

bringing a next hole in the second hub flange before the insertion position by rotating the hub to move the inserted spoke downward, wherein the hub is rotated over approximately 0.5 hole diameter in the opposite direction.

* * * * *